United States Patent
Botargues et al.

(10) Patent No.: US 8,200,421 B2
(45) Date of Patent: Jun. 12, 2012

(54) METHOD AND DEVICE OF TERRAIN AVOIDANCE FOR AN AIRCRAFT

(75) Inventors: Paule Botargues, Toulouse (FR); Nicolas Caule, Toulouse (FR); Christelle Ledauphin, Toulouse (FR); Jerome Bailly, Toulouse (FR); Isabelle Lacaze, Colomiers (FR); Sylvain Thezelais, Toulouse (FR); Jerome Goyet, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 337 days.

(21) Appl. No.: 12/582,240

(22) Filed: Oct. 20, 2009

(65) Prior Publication Data

US 2010/0100261 A1    Apr. 22, 2010

(30) Foreign Application Priority Data

Oct. 22, 2008  (FR) ...................................... 08 05848

(51) Int. Cl.
- *G06F 17/10* (2006.01)
- *G06G 7/78* (2006.01)
- *G06G 1/16* (2006.01)

(52) U.S. Cl. ..................... 701/301; 701/3; 701/4; 701/5; 701/6; 701/7; 701/8; 701/9; 701/10; 701/11; 701/18; 244/75.1; 244/180; 244/181; 244/182; 244/183; 244/184; 244/190; 340/945; 340/963; 340/967

(58) Field of Classification Search ................. 701/3, 4, 701/5, 6, 7, 8, 9, 10, 11, 14, 18, 300, 301; 244/75.1, 180, 181, 182, 183, 184, 190; 340/945, 340/963, 964, 967, 970, 973, 974, 977, 978, 340/979

See application file for complete search history.

(56) References Cited

U.S. PATENT DOCUMENTS

| | | | | |
|---|---|---|---|---|
| 6,097,996 A * | 8/2000 | Deker | ............................. | 701/10 |
| 6,161,063 A * | 12/2000 | Deker | ................................ | 701/4 |
| 6,173,219 B1 * | 1/2001 | Deker | ................................ | 701/3 |
| 6,181,987 B1 * | 1/2001 | Deker et al. | ...................... | 701/3 |
| 6,269,301 B1 * | 7/2001 | Deker | ........................... | 701/206 |
| 6,347,263 B1 * | 2/2002 | Johnson et al. | ................. | 701/14 |
| 7,064,680 B2 * | 6/2006 | Reynolds et al. | ............. | 340/961 |
| 7,433,779 B2 * | 10/2008 | Deker et al. | .................. | 701/122 |
| 7,570,177 B2 * | 8/2009 | Reynolds et al. | ............. | 340/961 |
| 7,996,121 B2 * | 8/2011 | Ferro et al. | ...................... | 701/11 |
| 2005/0049763 A1 | 3/2005 | Walsdorf | | |

(Continued)

FOREIGN PATENT DOCUMENTS

| | | |
|---|---|---|
| EP | 1 598 721 | 11/2005 |
| FR | 2 864 269 | 6/2005 |

(Continued)

OTHER PUBLICATIONS

Preliminary Search Report dated Jul. 13, 2009.

*Primary Examiner* — Khoi Tran
*Assistant Examiner* — Jamie Figueroa
(74) *Attorney, Agent, or Firm* — Dickinson Wright PLLC

(57) ABSTRACT

An altitude profile representative of the terrain overflown by an aircraft is established. Thereafter, an altitude limit curve which comprises an intersection with the altitude profile upon the engagement of a terrain avoidance maneuver is determined. As soon as there is no longer any intersection of the limit curve with the altitude profile, the terrain avoidance maneuver is interrupted.

6 Claims, 4 Drawing Sheets

| U.S. PATENT DOCUMENTS | | | FOREIGN PATENT DOCUMENTS | | |
|---|---|---|---|---|---|
| 2005/0273249 A1 | 12/2005 | Artini | FR | 2 881 533 | 8/2006 |
| 2007/0150170 A1 | 6/2007 | Deker | FR | 2 883 403 | 9/2006 |
| 2008/0103643 A1 | 5/2008 | Artini | FR | 2 888 955 | 1/2007 |
| 2008/0172148 A1 | 7/2008 | Isorce | WO | 2006/097592 | 9/2006 |
| 2008/0215195 A1 | 9/2008 | Jourdan | | | |

* cited by examiner

METHOD AND DEVICE OF TERRAIN AVOIDANCE FOR AN AIRCRAFT

FIELD OF THE INVENTION

The present invention relates to a terrain avoidance method and system for aircraft, as well as to an aircraft provided with such a system.

BACKGROUND OF THE INVENTION

It is known that numerous aircraft are equipped with a collision alert device making it possible to emit at least one alert signal in the case of a risk of the aircraft colliding with the terrain. Concerning the alert device, it may in particular be a device of TAWS ("Terrain Awareness and Warning System") type, of EGPWS ("Enhanced Ground Proximity Warning System") type or of GCAS ("Ground Collision Avoidance System") type.

Such a TAWS collision alert device is generally capable of emitting various types of alerts, the triggering of which is based on different algorithms and sources of information.

A terrain avoidance system for a civilian airplane equipped with a collision alert device of TAWS type is known through the document FR-2883403. This system automatically triggers a terrain avoidance maneuver when the collision alert device emits an alert to signal that the airplane is at risk of colliding with the terrain if it maintains its current flight characteristics. Thus, as soon as an alert is emitted, the system acts automatically (without pilot intervention) on the trajectory of the airplane throughout the duration of emission of the alert, so as to improve its situation with respect to the terrain. When the collision alert device ceases to emit said alert, the avoidance system automatically interrupts the collision avoidance maneuver.

However, it is possible that, at the end of a terrain avoidance maneuver, the airplane may still not be in a satisfactory situation from a safety point of view. Indeed, in certain situations (mountainous zones in particular), depending on the position and the trajectory of the airplane at the end of the avoidance maneuver, a new risk of collision may be detected by the collision alert device a very short time after the end of the avoidance maneuver, and this may lead to the engagement of a new terrain avoidance maneuver.

Now, this new avoidance maneuver is not desirable, on the one hand, in order to effect a resumption of control of the airplane by the pilots under good conditions and, on the other hand, to avoid discomfort to the passengers, if any.

SUMMARY OF THE INVENTION

The object of the present invention is to remedy these drawbacks by refining the aforesaid terrain avoidance system.

To this end, according to the invention, the terrain avoidance method for an aircraft equipped with a collision alert device which monitors the flight of said aircraft with respect to the surrounding terrain and which is able to emit at least one alert, when said aircraft is at risk of colliding with the terrain while maintaining its current flight characteristics, according to which method a terrain avoidance maneuver is engaged when said collision alert device emits such an alert, is notable:

in that the following steps are furthermore carried out:

A/ an altitude profile representative of said terrain overflown by said aircraft is established on the basis of at least one database characteristic of said terrain;

B/ a plurality of parameters of said aircraft such as its longitudinal speed, its vertical speed, its attitude, its angle of attack, its altitude, etc is measured;

C/ on the basis of at least some of said measured parameters, at least one altitude limit curve which belongs to a vertical plane passing through the longitudinal axis of said aircraft and which lies, at least partially, in front of said aircraft is determined, said limit curve comprising at least one intersection with said terrain altitude profile at least upon the engagement of said terrain avoidance maneuver;

D/ said intersection of the limit curve with the altitude profile is monitored; and E/ in the case where there is no longer any intersection of said limit curve with said altitude profile, said terrain avoidance maneuver is interrupted;

and in that said steps B/, C/, D/ and E/ are carried out in a successive and repetitive manner until said avoidance maneuver is interrupted.

Thus, by virtue of the invention, the terrain avoidance maneuver is exited as soon as it is considered that the aircraft is far enough away from the terrain that a collision alert is not produced immediately after the end of said avoidance maneuver. A resumption of control of the aircraft by the pilots under good conditions is thus ensured.

In a preferred implementation of the invention, said altitude limit curve consists of a series of segments comprising at least one horizontal segment.

The length of said horizontal segment can advantageously be determined, during said step C/, as a function of a terrain detection criterion which makes it possible to ensure that, when said avoidance maneuver is interrupted, said aircraft is at a minimum altitude allowing it to cross over the terrain situated in front of it.

Furthermore, said series of segments forming said limit curve can comprise an upward inclined segment, whose bottom end is connected to one of the ends of said horizontal segment and whose top end is oriented toward the sky.

Preferably, the inclination of this upward inclined segment is determined, during step C/, as a function of the current climb capability of said aircraft.

Additionally, said series of segments constituting said limit curve can moreover comprise a downward inclined segment, whose top end is connected to said aircraft and whose bottom end is oriented toward the ground and connected to one of the ends of said horizontal segment. This downward inclined segment makes it possible to ensure that, even if the aircraft is put into descent by the crew on exiting the maneuver, there will be no reengagement of the automatic facility before a certain interlude.

Thus, depending on the form of the altitude limit curve (for example one, two or three segments) as well as the length of each of the segments, it is possible to exit more or less rapidly the terrain avoidance maneuver in progress.

During said step E/, it is optionally possible to emit an information cue regarding absence of terrain prior to the interruption of said avoidance maneuver.

The invention relates furthermore to a terrain avoidance system for an aircraft which comprises:

a collision alert device which monitors the flight of said aircraft with respect to the surrounding terrain and which is able to emit at least one alert, when said aircraft is at risk of colliding with the terrain while maintaining its current flight characteristics; and an automatic piloting device able to apply a terrain avoidance maneuver to said aircraft automatically when such an alert is emitted by said alert device.

According to the invention, said terrain avoidance system furthermore comprises:
- means for establishing an altitude profile, representative of said terrain overflown by said aircraft, on the basis of at least one database characteristic of said terrain;
- means for measuring a plurality of parameters of said aircraft;
- means for determining, on the basis of at least some of said parameters measured by said measurement means, at least one altitude limit curve which belongs to a vertical plane passing through the longitudinal axis of said aircraft and which lies, at least partially, in front of said aircraft, said limit curve comprising at least one intersection with said altitude profile at least upon the engagement of said terrain avoidance maneuver;
- monitoring means able to monitor said intersection of the determined limit curve with the altitude profile; and
- means for interrupting said terrain avoidance maneuver, which are able to be activated when there is no longer any intersection of said limit curve with said altitude profile.

Moreover, the invention also relates to an aircraft provided with a terrain avoidance system such as mentioned above.

BRIEF DESCRIPTION OF THE DRAWINGS

The figures of the appended drawing will elucidate the manner in which the invention may be carried out. In these figures, identical references designate similar elements.

DETAILED DESCRIPTION OF THE INVENTION

Figure 1:
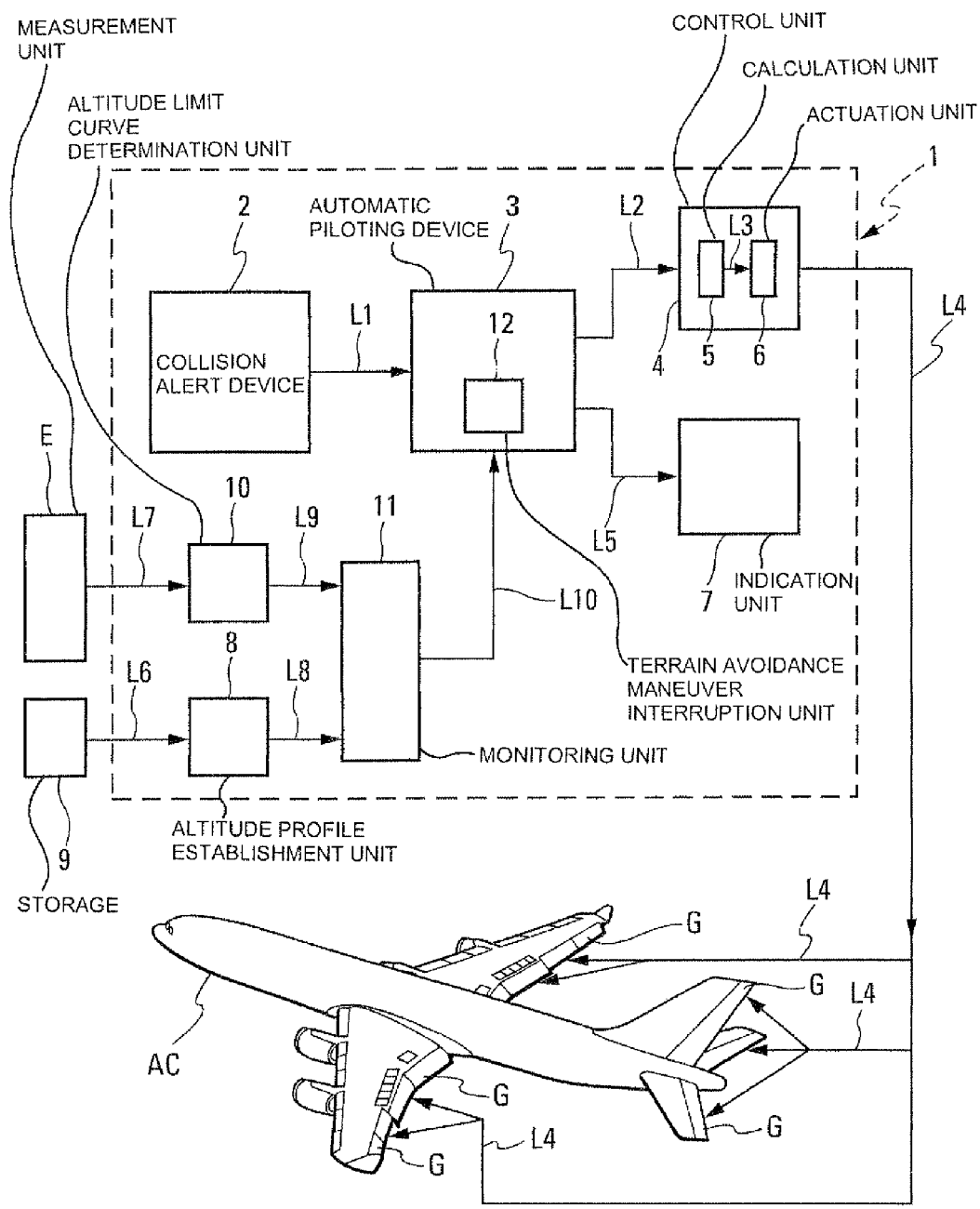
FIG. 1 represents, in the form of a schematic diagram, a terrain avoidance system in accordance with the present invention.

The terrain avoidance system for an aircraft AC has been schematically represented in FIG. 1. In this figure, the system 1, a set E of measurement means and storage means 9 of a database are represented outside the aircraft AC, although they are in reality mounted onboard the latter.

As shown by FIG. 1, the terrain avoidance system 1 comprises in a routine manner:
- a collision alert device 2, for example of TAWS type, which monitors the flight of the aircraft AC with respect to the surrounding terrain. This collision alert device 2 is apt to emit alerts when the aircraft AC is at risk of colliding with a relief of said terrain should it maintain its current flight characteristics (longitudinal speed, slope, etc.);
- an automatic piloting device 3 of the aircraft AC, connected by way of a link L1 to the collision alert device. This automatic piloting device 3 is able to determine and apply to said aircraft AC a terrain avoidance maneuver as soon as an alert is emitted by the collision alert device 2. In a routine manner, said automatic piloting device 3 can determine instructions for piloting the aircraft AC (for example a climb instruction to be applied to the aircraft AC so as to bring about a gain of height at the level of the relief of the terrain, or else a climb instruction to the aircraft AC as well as a heading instruction to be applied to said aircraft AC). The automatic piloting device 3 can form part of a routine automatic pilot (not represented) of the aircraft AC;
- control means 4 which are connected to the automatic piloting device 3, by way of the link L2. As a variant, they can be integrated, at least in part, into the automatic piloting device 3. The control means 4 are able to receive the piloting instructions originating from said automatic piloting device 3. They comprise for example calculation means 5 for determining control surface deflection instructions, based on the piloting instructions received, and actuation means 6 for actuating at least one control surface G of said aircraft AC which receive these control surface deflection instructions, by way of the link L3, and displace said control surface G accordingly by means of the link L4; and
- means of indication 7, connected to said automatic piloting device 3, by way of the link L5. These indication means 7 make it possible to forewarn the pilot or pilots of the aircraft AC when an avoidance maneuver is applied to the latter. Such an indication can consist of a visual information cue displayed on a viewing screen (for example mounted in the flight deck of the aircraft AC) and/or an audible alert.

According to the invention, the terrain avoidance system 1 furthermore comprises:
- means 8 for establishing an altitude profile (see FIGS. 2 to 4) associated with the terrain overflown by the aircraft AC. These means 8 are connected, by way of the link L6, to the routine means of storage 9 of a topographic database of said terrain, so as to establish said altitude profile;
- means 10 for determining at least one altitude limit curve (see FIGS. 2 to 4) which is associated with the aircraft AC. The determination means 10 are able to receive, by way of the link L7, data relating to the aircraft AC (for example its longitudinal speed, its vertical speed, its attitude, its inclination, its altitude, etc.) originating from the set of measurement means E. On the basis of the data obtained, these determination means 10 are able to determine an altitude limit curve (defined in greater detail hereinafter) such that, at least upon the engagement of said terrain avoidance maneuver, it cuts the terrain altitude profile established by said means 8;
- monitoring means 11, connected to said means 8 and to said determination means 10 by way respectively of the links L8 and L9, These monitoring means 11 are able to monitor whether the limit curve determined by the determination means 10 still comprises an intersection with the terrain altitude profile and, in the case where such an intersection no longer exists (the limit curve no longer cuts the altitude profile), they are able to deliver to the automatic piloting device 3, by way of the link L10, a signal representative of the absence of terrain ahead of the aircraft AC; and
- means 12 for interrupting a terrain avoidance maneuver, for example integrated into the automatic piloting device 3. These interruption means 12 are able to interrupt an avoidance maneuver in progress when said automatic piloting device 3 receives, by way of the link L10, a signal representative of the absence of terrain ahead of the aircraft AC by said verification means 11. A terrain absence message may optionally reach the pilots by way of the indication means 7 before the interruption of the terrain avoidance maneuver.

Figure 2:
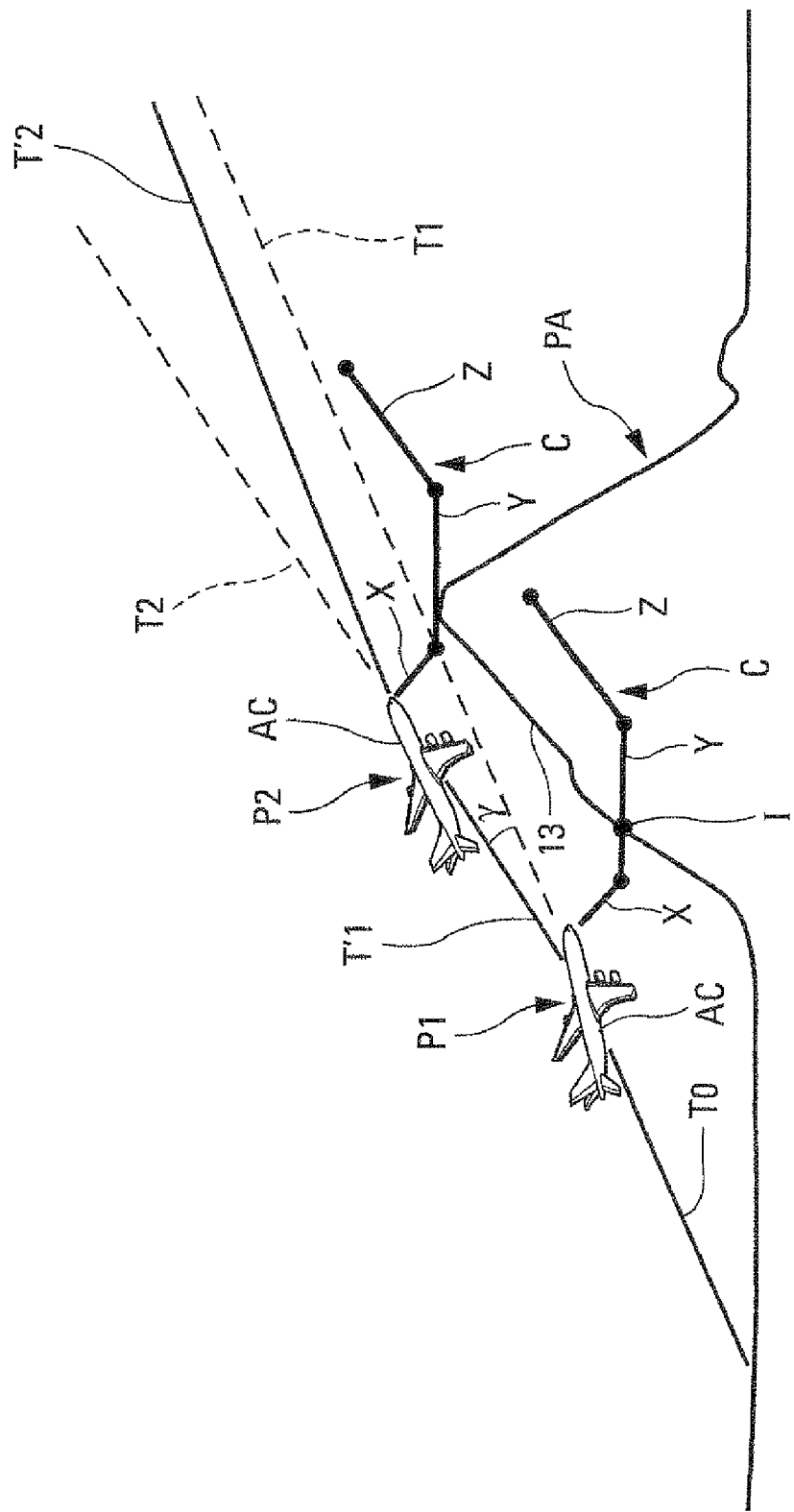
FIG. 2 is a schematic view illustrating an exemplary relief avoidance maneuver by an aircraft in flight, in the course of which a first type of altitude limit curve in accordance with the invention is implemented.

Represented in FIG. 2 is an example illustrating a terrain avoidance maneuver by the aircraft AC in the course of which a first type of altitude limit curve associated with the aircraft AC is implemented.

The altitude profile PA of the terrain overflown by the aircraft AC, which has been established by the means 8 (FIG. 1), is furthermore represented in FIG. 2.

The aircraft AC is represented at the moment of the emission of an alert by the collision alert device 2 (position P1). It is indeed at risk of hitting the terrain (mountain 13) if it continues its flight as is, as illustrated by the trajectory T1 (dashed), the continuation of the current trajectory T0. At this moment, the terrain avoidance system 1 subjects the aircraft AC automatically to an instruction for additional climb comprising a slope γ which is added to the slope corresponding to the current trajectory T0, so that the aircraft AC then no longer follows the trajectory T1, but an additional climb trajectory T1'.

Also illustrated in FIG. 2 is the altitude limit curve C determined by the determination means 10 (FIG. 1) after the emission of an alert by the collision alert device 2.

This altitude limit curve C, defined in a vertical plane passing through the longitudinal axis of the aircraft AC and situated at least in part ahead of the latter, consists of the following three segments:
- a segment X inclined downward (for example by a few degrees with respect to the horizontal), whose top end is connected to the aircraft AC and whose bottom end is oriented toward the ground;
- a horizontal segment Y, connected by an end to the bottom end of the segment X; and
- an upward inclined segment Z, whose bottom end is connected to the other end of the horizontal segment Y and whose top end is oriented toward the sky. The inclination of the segment Z with respect to the horizontal can be determined as a function of the current climb capability of said aircraft.

As shown by FIG. 2, the altitude limit curve C comprises an intersection with the terrain altitude profile PA during the engagement of the terrain avoidance maneuver (point U.

As soon as there is no longer any intersection of the limit curve C with the altitude profile PA (the aircraft AC is then in position P2), the terrain avoidance maneuver is interrupted and the aircraft AC continues for example a trajectory T'2, different from the trajectory T2 (represented dashed), continuation of the trajectory T'1 that it would have followed if the terrain avoidance maneuver had not been interrupted. The trajectory T'2 is for example determined in a routine manner on the basis of instructions given by the pilots of the aircraft AC.

Figure 3:
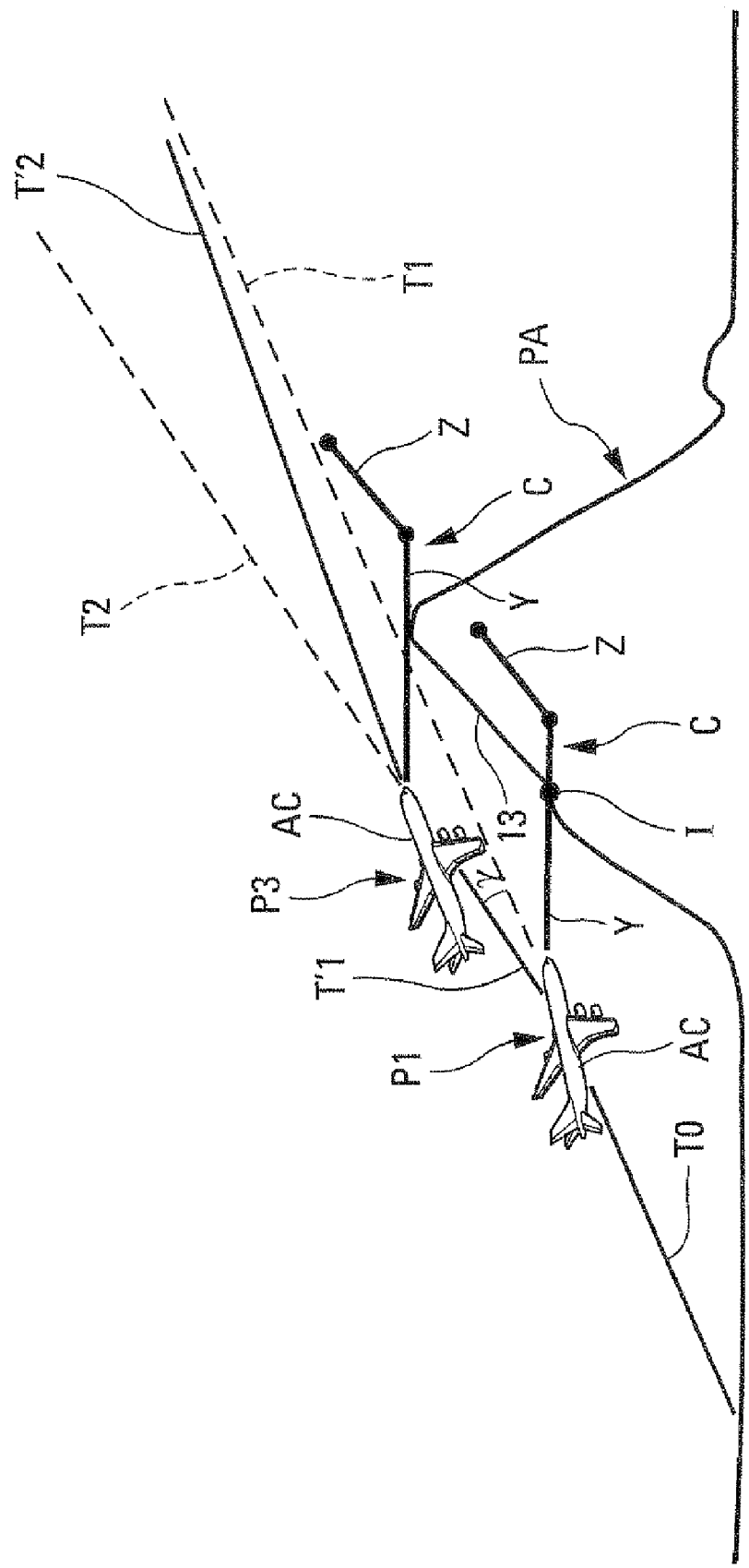
FIGS. 3 and 4 are analogous to FIG. 2, the altitude limit curves implemented in the course of the relief avoidance maneuver being respectively of a second and of a third type in accordance with the invention.

Moreover, represented in FIG. 3 is the exemplary avoidance maneuver of FIG. 2, in the course of which an altitude limit curve C of a second type is implemented. Indeed, the limit curve C comprises solely the horizontal segment Y and the upward inclined segment Z (such as described above), the segment X being of zero length.

Thus, as shown by FIG. 3, the limit curve C ceases to intercept the altitude profile PA earlier (the aircraft AC is in the position P3 between the position P1 and P2). The choice is therefore made to protect the aircraft AC in a zone that is more restricted in terms of avoidance maneuver exit, this making it possible on the other hand to exit the avoidance maneuver more rapidly.

Figure 4:
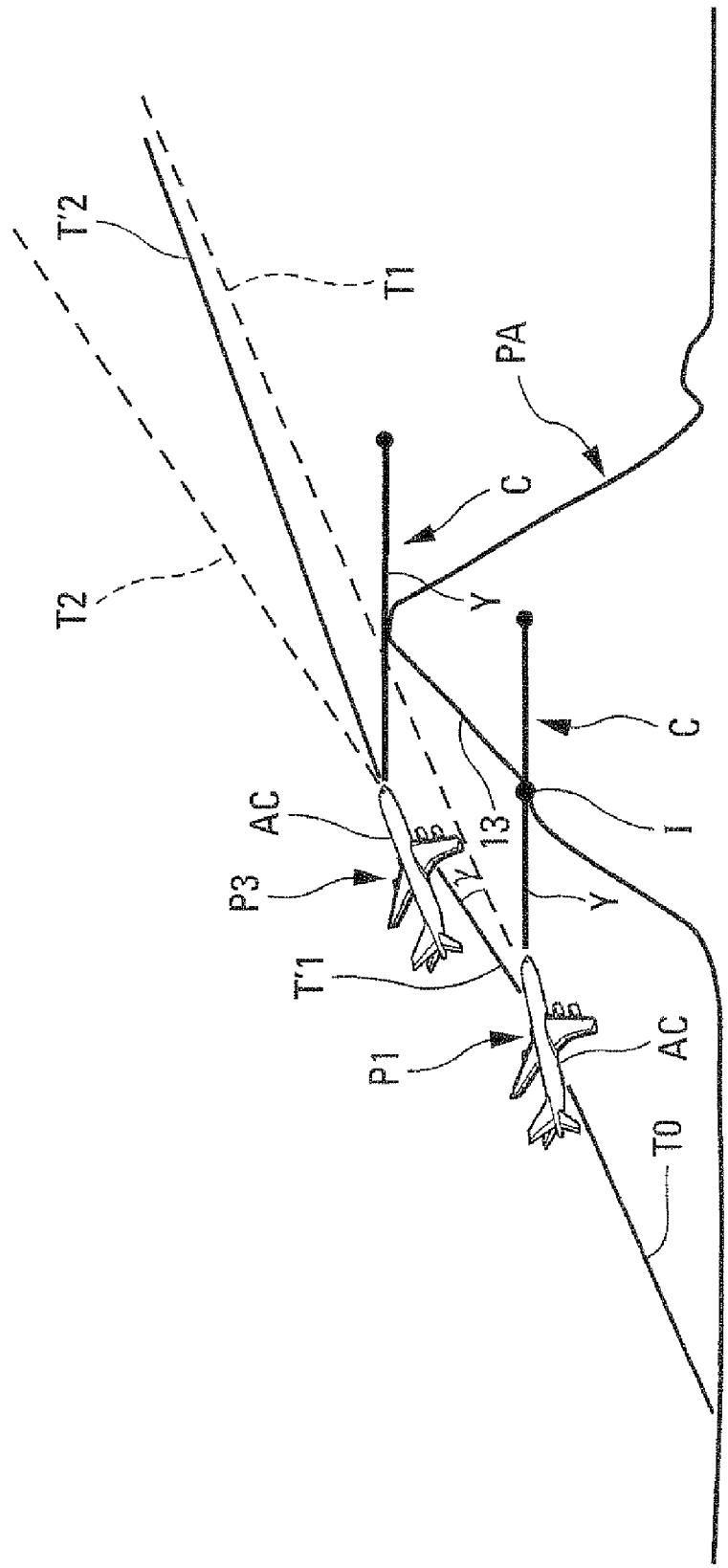

Represented in FIG. 4 is a third simplified type of altitude limit curve C. Indeed, the limit curve C now comprises only a single horizontal segment Y. The length of the latter is for example determined in such a way that, when said avoidance maneuver is interrupted, the aircraft AC is at a minimum altitude (position P3) allowing it to cross over the terrain situated in front of it.

The invention claimed is:

1. A terrain avoidance method for an aircraft equipped with a collision alert device which monitors the flight of said aircraft with respect to the surrounding terrain and which is able to emit at least one alert, when said aircraft is at risk of colliding with the terrain while maintaining its current flight characteristics, according to which method a terrain avoidance maneuver is engaged when said collision alert device emits such an alert, the method comprising:
   (a) establishing an altitude profile representative of said terrain overflown by said aircraft on the basis of at least one database characteristic of said terrain;
   (b) measuring a plurality of parameters of said aircraft;
   (c) on the basis of at least some of said measured parameters, determining at least one altitude limit curve which belongs to a vertical plane passing through the longitudinal axis of said aircraft and which lies, at least partially, in front of said aircraft, wherein said limit curve comprises at least one intersection with said terrain altitude profile at least upon the engagement of said terrain avoidance maneuver, and
   wherein said at least one altitude limit curve consists of a series of segments comprising at least one horizontal segment, and said series of segments comprises an upward inclined segment, whose bottom end is connected to one of the ends of said horizontal segment and whose top end is oriented toward the sky;
   (d) determining the inclination of said upward inclined segment, during step (c), as a function of the current climb capability of said aircraft;
   (e) determining the length of said horizontal segment, during step (c), as a function of a terrain detection criterion which makes it possible to ensure that, when said avoidance maneuver is interrupted, said aircraft is at a minimum altitude allowing it to cross over the terrain situated in front of said aircraft;
   (f) monitoring said intersection of the limit curve with the altitude profile;
   (g) interrupting said terrain avoidance maneuver in the case where there is no intersection of said limit curve with said altitude profile; and
   carrying out steps (b), (c), (d), (e), (f) and (g) in a successive and repetitive manner until said avoidance maneuver is interrupted.

2. The method as claimed in claim 1,
   wherein said series of segments constituting said limit curve further comprises a downward inclined segment, the top end of said downward inclined segment is connected to said aircraft and the bottom end of said downward inclined segment is oriented toward the ground and connected to one of the ends of said horizontal segment, said downward inclined segment ensuring that, even if the aircraft is put into descent by the crew on an exiting maneuver, there is no reengagement of an automatic facility before a certain interlude.

3. The method as claimed in claim 1,
   wherein said aircraft parameters measured during step (b) are selected from the group consisting of
   the longitudinal speed of said aircraft;
   the vertical speed of said aircraft;
   the attitude of said aircraft;
   the angle of attack of said aircraft; and
   the altitude of said aircraft.

4. The method as claimed in claim 1, further comprising:
emitting, during step (g), an information cue regarding absence of terrain prior to the interruption of said avoidance maneuver.

5. A terrain avoidance system for an aircraft, said system comprising:
- a collision alert device which monitors the flight of said aircraft with respect to the surrounding terrain and emits at least one alert, when said aircraft is at risk of colliding with the terrain while maintaining its current flight characteristics;
- an automatic piloting device that applies a terrain avoidance maneuver to said aircraft automatically when the at least one alert is emitted by said collision alert device;
- an altitude profile establishment unit that establishes an altitude profile, representative of said terrain overflown by said aircraft, on the basis of at least one database characteristic of said terrain;
- a parameter measurement unit that measures a plurality of parameters of said aircraft;
- an altitude limit curve determination unit that determines, on the basis of at least one of said parameters measured by said measurement means, at least one altitude limit curve which belongs to a vertical plane passing through the longitudinal axis of said aircraft and which lies, at least partially, in front of said aircraft, said limit curve comprising at least one intersection with said altitude profile at least upon the engagement of said terrain avoidance maneuver;
- a monitoring unit that monitors said intersection of the determined limit curve with the altitude profile; and
- an interruption unit that interrupts said terrain avoidance maneuver, wherein the interruption unit is activated when there is no intersection of said limit curve with said altitude profile.

6. An aircraft,
comprising a terrain avoidance system of claim 5.

* * * * *